(12) United States Patent
Cheshire et al.

(10) Patent No.: US 8,156,081 B2
(45) Date of Patent: Apr. 10, 2012

(54) METHOD AND APPARATUS FOR UPDATING RESOURCE RECORDS IN A NAME-SERVER DATABASE

(75) Inventors: Stuart D. Cheshire, San Jose, CA (US); Kiren Ravi Sekar, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1717 days.

(21) Appl. No.: 10/877,414

(22) Filed: Jun. 25, 2004

(65) Prior Publication Data

US 2005/0289240 A1 Dec. 29, 2005

(51) Int. Cl.
*G06F 7/00* (2006.01)

(52) U.S. Cl. ....................................... 707/655
(58) Field of Classification Search ............ 707/242
See application file for complete search history.

(56) References Cited

U.S. PATENT DOCUMENTS

| | | | |
|---|---|---|---|
| 5,790,548 A | 8/1998 | Sistanizadeh et al. | |
| 6,564,216 B2 * | 5/2003 | Waters | 707/10 |
| 6,971,005 B1 * | 11/2005 | Henry et al. | 713/155 |
| 7,088,694 B1 * | 8/2006 | Rune | 370/331 |
| 2002/0010767 A1 * | 1/2002 | Farrow et al. | 709/223 |
| 2003/0067923 A1 * | 4/2003 | Ju et al. | 370/395.3 |
| 2003/0163584 A1 * | 8/2003 | Anderson et al. | 709/245 |
| 2006/0190623 A1 * | 8/2006 | Stahura | 709/245 |

* cited by examiner

*Primary Examiner* — Apu Mofiz
*Assistant Examiner* — Thu Nga Nguyen
(74) *Attorney, Agent, or Firm* — Park, Vaughan, Fleming & Dowler LLP; Laxman Sahasrabuddhe

(57) ABSTRACT

One embodiment of the present invention provides a system for updating resource records in a name-server database. During system operation, a network node creates an update-request message containing a set of resource-record updates, and a requested lease, which specifies the length of time for which the name server is being requested to store the resource-record updates. Next, the network node sends the update-request message to a name server, which is part of a distributed system that provides a global naming service. The network node then receives a response message from the name server, wherein the response message contains a granted lease, which specifies the length of time for which the name-server database will store the resource-record updates.

19 Claims, 5 Drawing Sheets

METHOD AND APPARATUS FOR UPDATING RESOURCE RECORDS IN A NAME-SERVER DATABASE

BACKGROUND

1. Field of the Invention

The present invention relates to the process of updating a name-server database. More specifically, the present invention relates to a method and apparatus for updating resource records in a name-server database by sending an update-request message to a name server, wherein the update-request message includes a requested lease, which specifies a length of time for which the name server is being requested to store the resource-record updates.

2. Related Art

The Domain Name System (DNS) is a distributed system that provides a global naming service. Like many other services, DNS was designed for essentially a static network, in which the global namespace was expected to change infrequently. Since the frequency of changes was expected to be fairly low, DNS was not designed to handle dynamic updates.

Subsequently, DNS has been extended to support dynamic updates. IETF (Internet Engineering Task Force) RFC (Request For Comments) 2136 specifies an extension to DNS, which allows DNS to handle dynamic updates. In this extension, a network node, such as a laptop, is required to provide explicit updates to the DNS name server.

Unfortunately, this extension can cause the DNS name server to contain stale information. Consider, for instance, a mobile user whose laptop updates the DNS name server via dynamic update. Note that, the updates will continue to remain on the DNS name server, until they are explicitly deleted. For example, if the user unplugs the laptop from the network without explicitly deleting the updates, the updates will continue to remain on the DNS name server indefinitely. This can be a serious problem, because it causes the DNS name-server database to contain stale information, which reduces the accuracy and usefulness of the DNS name-server database.

"DNS Scavenging" is an attempt to address the above problem. In "DNS Scavenging," a client network-node, such as a laptop, and the DNS name server are configured with a preset refresh interval. Unfortunately, this method works only if both the laptop and the DNS name server are configured with compatible refresh intervals, which can only be guaranteed if they are under the same administration. In many situations, the laptop and the DNS name-server are under different administrations. Hence, "DNS Scavenging" is severely limited in its use.

Hence, what is needed is a method and apparatus for dynamically updating a name-server database without the above-described drawbacks.

SUMMARY

One embodiment of the present invention provides a system for updating resource records in a name-server database. During system operation, a network node creates an update-request message containing a set of resource-record updates, and a requested lease, which specifies the length of time for which the name server is being requested to store the resource-record updates. Next, the network node sends the update-request message to a name server, which is part of a distributed system that provides a global naming service. The network node then receives a response message from the name server, wherein the response message contains a granted lease, which specifies the length of time for which the name-server database will store the resource-record updates.

In a variation on this embodiment, a name server receives an update-request message from a network node containing a set of resource-record updates, and a requested lease, which specifies the length of time for which the name server is being requested to store the resource-record updates. Next, the name server updates the resource records in the name-server database using the information contained in the update-request message. The name server then sends a response message to the network node, wherein the response message contains a granted lease, which specifies the length of time for which the name-server database will store the resource-record updates.

In a variation on this embodiment, if the granted lease expires, the name server deletes the updated resource-records from the name-server database, thereby keeping the global namespace up to date by removing stale information.

In a variation on this embodiment, the set of resource-record updates can include zero or more updated resource-records.

In a variation on this embodiment, the update-request message can be an update-refresh message, which constitutes a request to extend the current lease for the updated resource-records.

In a variation on this embodiment, the update-refresh message is identical to a preceding update-request message, which caused the name server to grant the current lease for the updated resource-records.

In a variation on this embodiment, if the network node does not receive a response message from the name server within a specified time, the network node resends the update-request message to the name server.

In a variation on this embodiment, the network node and the name server communicate with each other using UDP (User Datagram Protocol).

In a variation on this embodiment, the network node and the name server communicate with each other using TCP (Transmission Control Protocol).

In a variation on this embodiment, the name server belongs to the Domain Name System (DNS).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (Compact Discs) and DVDs (Digital Versatile Discs or Digital Video Discs), and computer instruction signals embodied in a transmission medium (with or without a carrier wave upon which the signals are modulated). For example, the transmission medium may include a communications network, such as the Internet.

Network

Figure 1:
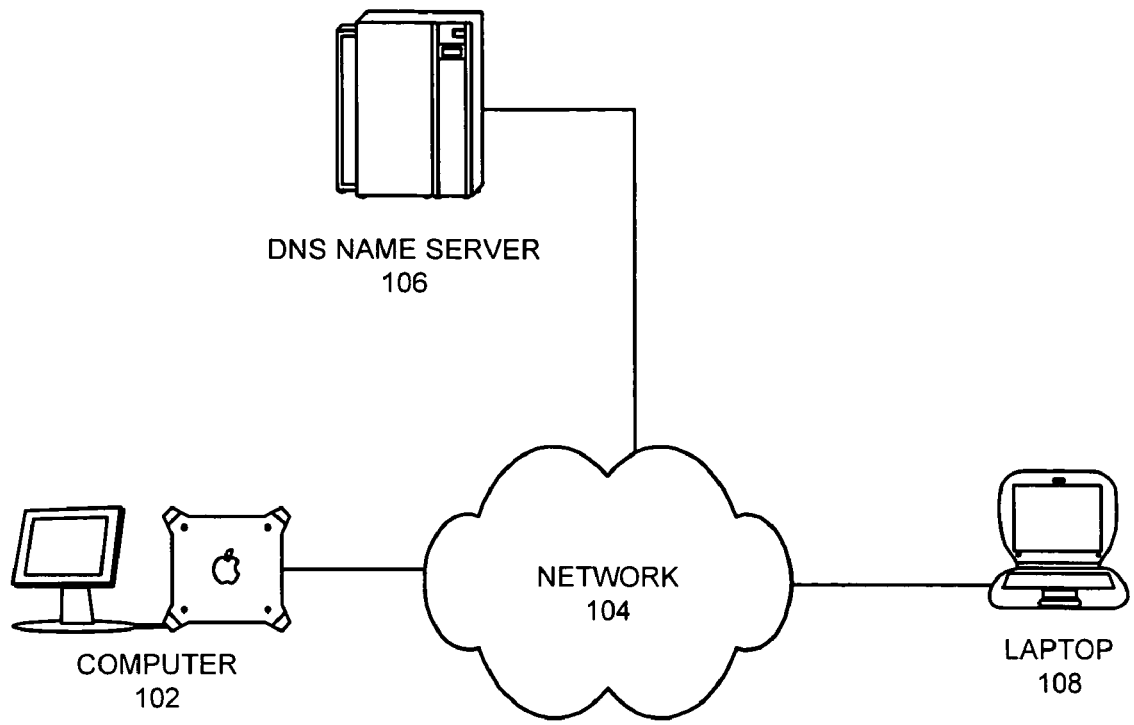
FIG. 1 illustrates a network that is connected to multiple network nodes, namely, a computer, a DNS (Domain Name System) name server, and a laptop in accordance with an embodiment of the present invention.

FIG. 1 illustrates a network 104 that is connected to multiple network nodes, namely, a computer 102, a DNS (Domain Name System) name server 106, and a laptop 108 in accordance with an embodiment of the present invention.

Network 104 can generally include any type of wire or wireless communication channel capable of coupling together network nodes. This includes, but is not limited to, a local area network, a wide area network, or a combination of networks. In one embodiment of the present invention, network 104 includes the Internet.

A network node, such as a computer 102, can generally include any type of communication device capable of communicating with other network nodes via a network. This includes, but is not limited to, a computer system based on a microprocessor, a mainframe computer, a server, a printer, a video camera, an external disk drive, a router, a switch, a personal organizer, and a mobile phone.

Network 104 allows a source network-node, such as a computer 102, to communicate with a target network-node, such as a laptop 108. But, before the communication can take place, the source network-node, computer 102, needs to know the IP address of the target network-node, laptop 108. Typically, computer 102 translates the laptop's 108 name into a corresponding IP address by querying a DNS name server 106.

Structure of a DNS Update Packet

Figure 2:
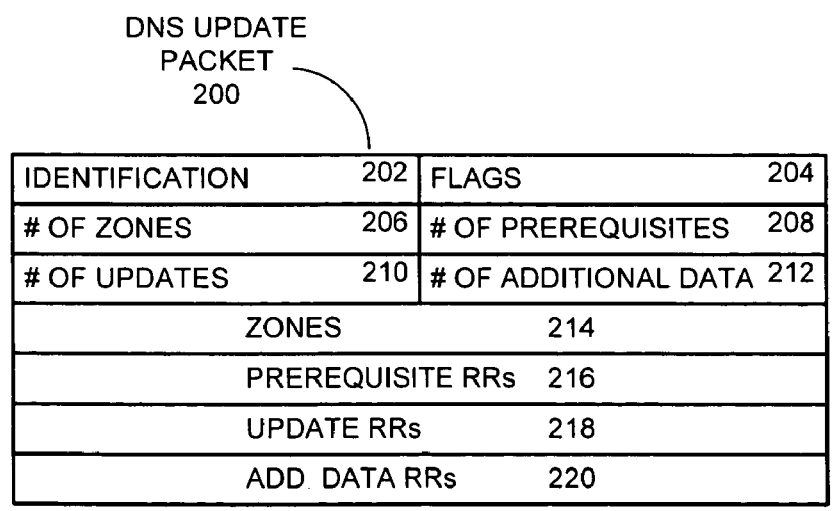
FIG. 2 illustrates a DNS update packet that contains multiple pieces of information that can be used by a network node, such as a computer, to exchange information with a DNS name server in accordance with an embodiment of the present invention.

FIG. 2 illustrates a DNS update packet 200 that contains multiple pieces of information that can be used by a network node, such as a computer 102, to exchange information with a DNS name server 106 in accordance with an embodiment of the present invention.

Update-request messages and response messages both use the same DNS update packet 200 format. Specifically, a DNS update packet 200 contains an identification field 202, which allows a network node, such as a computer 102, to match update-requests to the corresponding responses. DNS packet 200 also contains a flags field 204, which among other things, indicates whether the DNS packet 200 is an update-request or a response.

Furthermore, DNS packet 200 contains four variable-length fields, namely, zones 214, prerequisite resource-records 216, update resource-records 218, and additional data resource-records 220. These variable-length fields are used for exchanging information between a network node, computer 102, and a DNS name server 106.

Additionally, DNS packet 200 contains four other fields, namely, a number of zones field 206, a number of prerequisite resource-records field 208, a number of update resource-records field 210, and a number of additional data resource-records field 212, which specify the number of entries in the four variable-length fields.

Structure of a Zone Field

Figure 3:
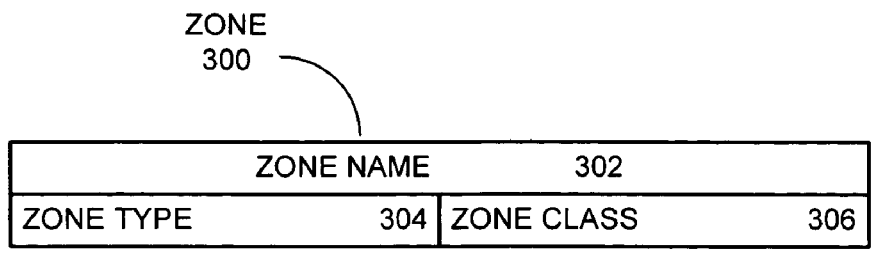
FIG. 3 illustrates the structure of a zone field that makes up the zones field in accordance with an embodiment of the present invention.

FIG. 3 illustrates the structure of a zone field 300 that makes up the zones field 214 in accordance with an embodiment of the present invention. Zone field 300 contains a zone name field 302, which specifies the zone name for the resource-record updates. Furthermore, zone field 300 includes a zone type field 304, and a zone class field 306, which specifies the type and the class of the zone 300, respectively.

Structure of a Resource Record

Figure 4:
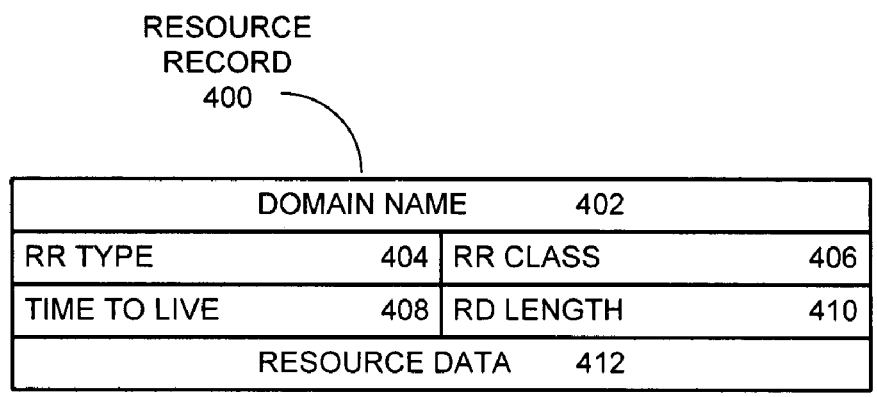
FIG. 4 illustrates the structure of a resource record that can be used by a network node, such as a computer, to exchange information with a DNS name server in accordance with an embodiment of the present invention.

FIG. 4 illustrates the structure of a resource record 400 that can be used by a network node, such as a computer 102, to exchange information with a DNS name server 106 in accordance with an embodiment of the present invention.

Specifically, resource record 400 contains a domain name field 402, which specifies the domain name under consideration. Resource record 400 also contains a resource-record type field 404 and a resource-record class field 406, which specifies the type and class of the resource record, respectively.

Additionally, resource record 400 includes a time-to-live (TTL) field 408, which specifies the amount of time (in seconds) that the resource record can be cached by a network node, such as a computer 102.

Furthermore, resource record 400 contains a resource data field 412, which is a variable-length field that can be used by a network node, such as a computer 102, to exchange information with a DNS name server 106. Resource record 400 also contains a resource data length field 410, which specifies the amount of data in the variable-length resource data field 412.

Structure of a Resource Data Field that Specifies a Lease

Figure 5:
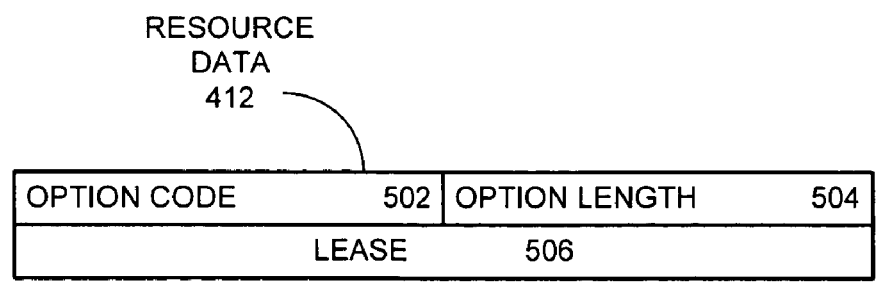
FIG. 5 illustrates the structure of the resource data field, which specifies a lease in accordance with an embodiment of the present invention.

FIG. 5 illustrates the structure of the resource data field 412, which specifies a lease in accordance with an embodiment of the present invention.

Specifically, resource data field 412 contains an option code field 502, which specifies the type of resource data. Resource data field 412 also contains the lease field 506. Note that, the lease field 506 can be used both by a network node 102 to request a lease, and by a DNS name server 106 to grant a lease. Additionally, resource data field 412 contains an option length field 504, which specifies the length of the lease field 506.

Furthermore, resource data field 412 is contained in an OPT pseudo-RR (pseudo-resource-record), which is defined in IETF RFC 2671. Note that, IETF RFC 2671 specifies a mechanism to define new resource-record data types. Additionally, OPT pseudo-RRs are contained in the additional data resource-records field 220 in the DNS update packet 200.

Process of Updating Resource Records

Figure 6:
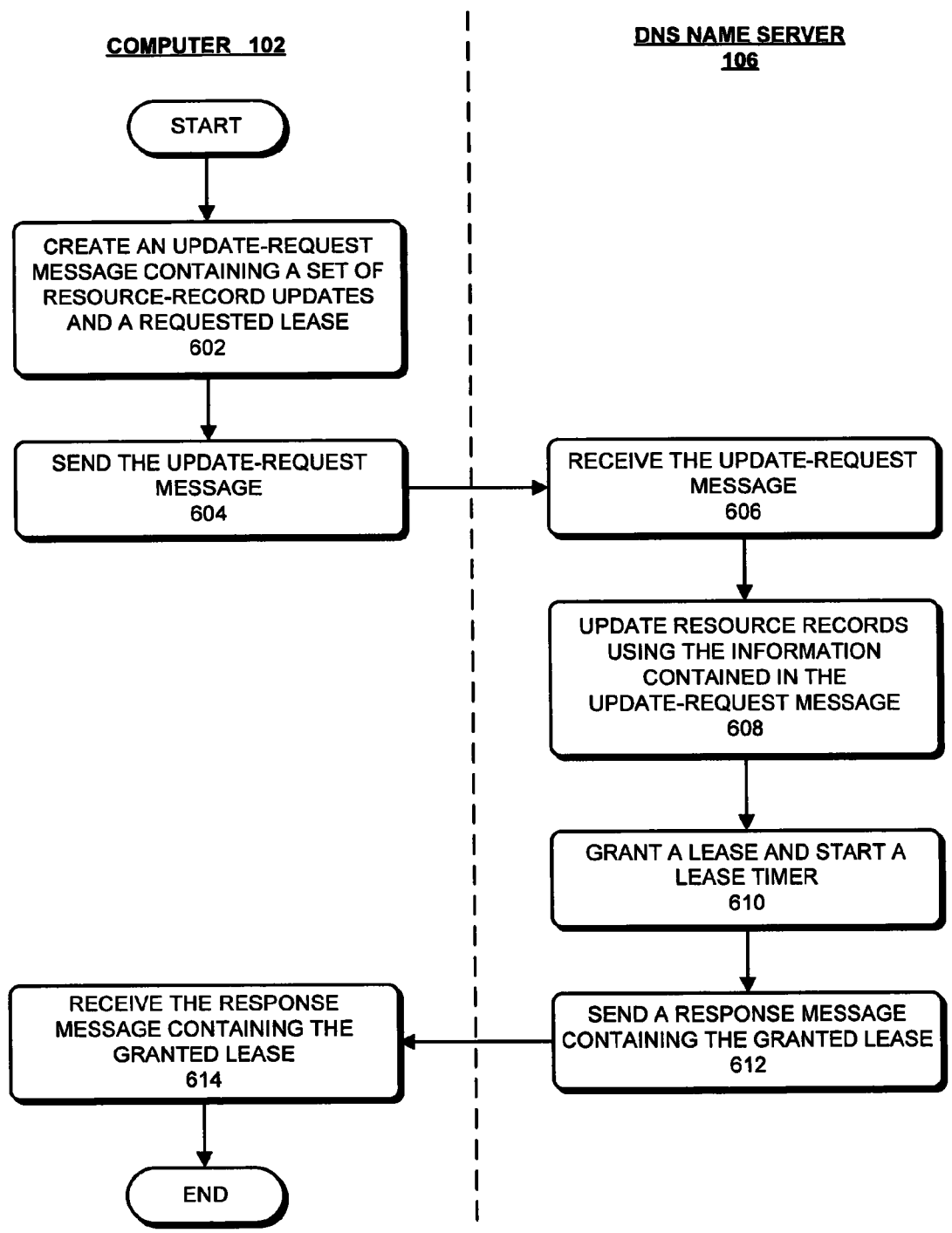
FIG. 6 presents a flowchart illustrating the process of updating resource records in accordance with an embodiment of the present invention.

FIG. 6 presents a flowchart illustrating the process of updating resource records in accordance with an embodiment of the present invention.

The process starts, for example, when a network node, such as a laptop 108, joins the network 104. First, laptop 108 creates an update-request message containing a set of resource-record updates and a requested lease (step 602).

Note that, the update-request message includes a DNS update packet 200. Furthermore, the resource-record updates are specified in the update resource-records field 218 in the DNS update packet 200. Moreover, the requested lease is specified in the lease field 506, which is contained in the resource data field 412. Additionally, the resource data field 412 is contained in the additional data resource-records field 220 in the DNS update packet 200.

The laptop 108 then sends the update-request message to a DNS name server 106 (step 604). Note that, the laptop 108 can use UDP (User Datagram Protocol) or TCP (Transmission Control Protocol) to exchange update-request messages and response messages with the DNS name server 106.

Next, the DNS name server 106 receives the update-request message (step 606). The DNS name server 106 then updates the resource-records using the information contained in the update-request message (step 608). Next, the DNS name server 106 grants a lease and starts the lease timer (step 610).

Note that, the granted lease can be equal to, less than, or greater than the requested lease. Furthermore, in order to reduce the network and server load, the DNS server 106 can define a minimum value, such as 120 minutes, for the granted lease.

The DNS name server 106 then sends a response message containing the granted lease (step 612). Note that, the response message includes a DNS update packet 200. Moreover, the granted lease is specified in the lease field 506, which is contained in the resource data field 412. Additionally, the resource data field 412 is contained in the additional data resource-records field 220 in the DNS update packet 200.

The laptop 108 then receives the response message containing the granted lease (step 614). In one embodiment of the present invention, the response message may only contain an acknowledgement, which specifies that the update-request message was received and indicates the status, that is, the success or failure, of the update request. Furthermore, if the laptop 108 does not receive a response from the DNS name server 106 within a specified time, it can resend the update-request message one or more times.

In this manner, a network node, such as a laptop 108, can update resource records in the DNS server 106, thereby allowing another network node, such as a computer 102, to access these resource records for purposes such as to translate laptop's 108 name into the corresponding IP address by querying a DNS name server 106.

Process of Deleting Stale Resource Records

Figure 7:
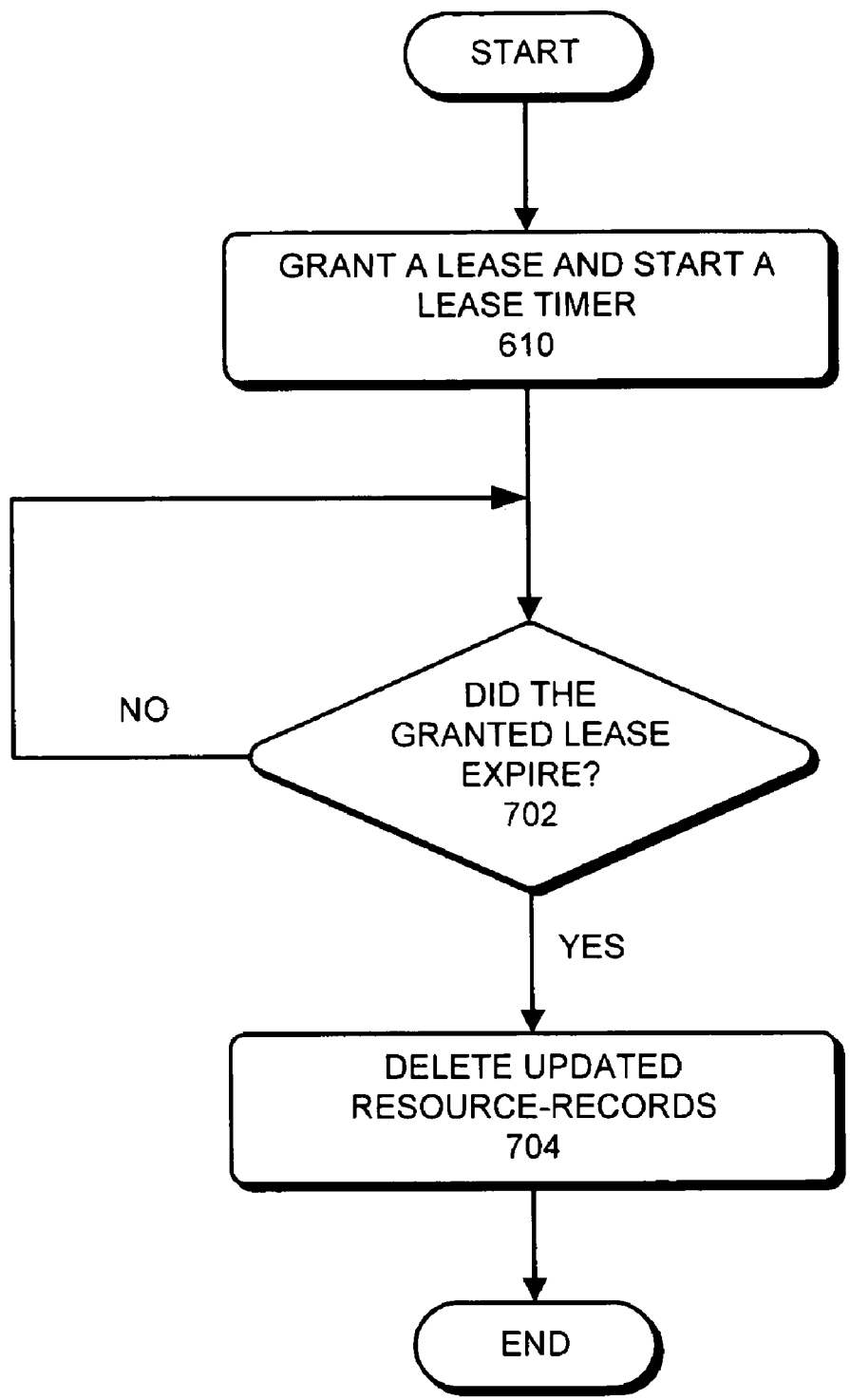
FIG. 7 presents a flowchart illustrating the process of deleting stale resource records in accordance with an embodiment of the present invention.

FIG. 7 presents a flowchart illustrating the process of deleting stale resource records in accordance with an embodiment of the present invention.

Upon receiving an update-request from a network node, such as a laptop 108, DNS name server 106 grants a lease and starts a lease timer (step 610). Next, the DNS name server 106 checks whether the granted lease has expired (step 702). If the granted lease has expired, then the DNS name server 106 deletes the updated resource-records (step 704).

Note that, a granted lease can expire due to various reasons, such as when a user disconnects the laptop 108 form the network 104. In the absence of the present invention, the DNS name server 106 continues to store stale resource records that correspond to the disconnected laptop 108. This reduces the accuracy and usefulness of the information in the DNS name server 106.

In contrast, by deleting stale resource-records upon expiration of the granted lease, the present invention keeps the information on the DNS name server 106 up to date, thereby maintaining the accuracy and usefulness of the information on the DNS name server 106.

Process of Refreshing Resource Records

Figure 8:
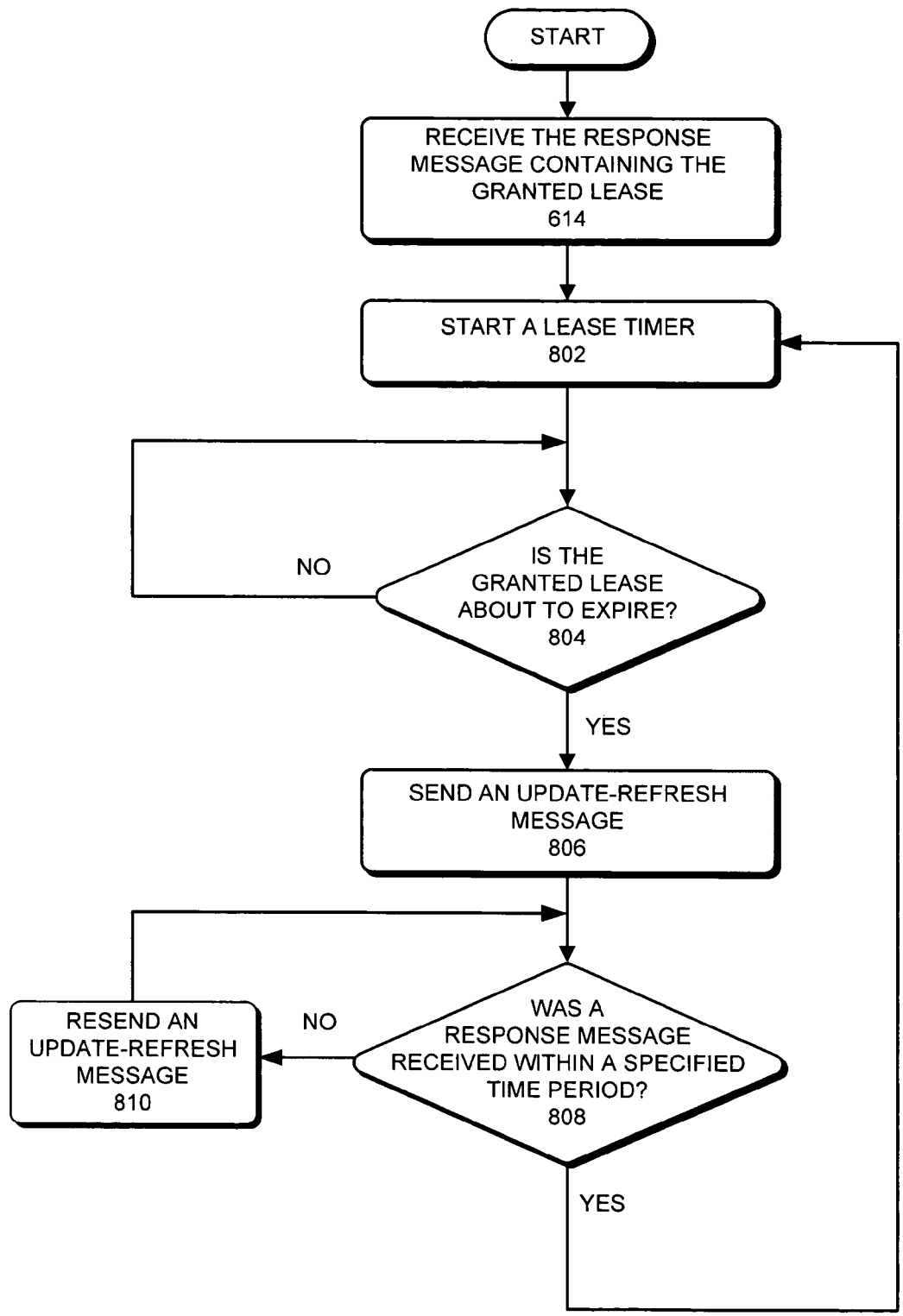
FIG. 8 presents a flowchart illustrating the process of refreshing resource records in accordance with an embodiment of the present invention.

FIG. 8 presents a flowchart illustrating the process of refreshing resource records in accordance with an embodiment of the present invention.

Upon receiving the response message containing the granted lease (step 614), the laptop 108 starts a lease timer (step 802). Next, the laptop 108 checks whether the granted lease is about to expire (step 804). If the granted lease is about to expire, the laptop 108 sends an update-refresh message (step 806) to the DNS name server 106.

The laptop 108 then checks whether a response message was received from the DNS name server 106 within a specified time period (step 808). If a response message was not received, the laptop 108 resends an update-refresh message (step 810) to the DNS name server 106. On the other hand, if a response was received within the specified time period, then the laptop 108 again starts a lease timer (step 802).

Note that the laptop 108 can resend update-refresh messages to the DNS name server 106 multiple times if no response is received. Moreover, each time the laptop 108 sends an update-refresh message, the laptop 108 can wait for a different time period before retrying again.

Furthermore, the refresh-request message can be identical to the original update-request message, which caused the DNS name server 106 to grant a new lease. Additionally, the DNS name server 106 can respond to a refresh-request message by sending a response message containing the new granted-lease.

Additionally, if a network node, such as a laptop 108, has sent multiple update-request messages to the DNS name server 106, the network node can include refresh-requests for all of the preceding resource-record updates in a single update-refresh message.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for updating resource records, the method comprising:
   in a network node, generating an update-request message that includes:
      a set of resource-record updates, and
      a requested lease, which specifies a time-to-live for which a name server is being requested by the network node to store the set of resource-record updates;
   sending the update-request message from the network node to the name server, which is part of a distributed system that provides a global naming service; and
   receiving a response message at the network node from the name server, wherein the response message is associated with the update-request message, and wherein the response message includes a granted lease which specifies a time-to-live for which the name server is expected to store the resource-records updates.

2. The method of claim 1, wherein the update-request message is an update-refresh message, which constitutes a request to extend the granted lease for the set of resource-record updates.

3. The method of claim 2, wherein the update-refresh message is identical to a preceding update-request message, which caused the name server to send a response message that included the granted lease for the set of resource-record updates.

4. The method of claim 1, wherein if the response message is not received within a specified time, the method further comprises resending the update-request message to the name server.

5. A method for updating resource records, the method comprising:
   receiving an update-request message at a name server, wherein the update-request message is received from a network node, and wherein the update-request message includes:
      a set of resource-record updates, and
      a requested lease, which specifies a time-to-live for which the name server is being requested by the network node to store the set of resource-record updates;
   updating resource records using the information contained in the update-request message; and
   sending a response message to the network node, wherein the response message includes a granted lease which specifies a time-to-live for which the name server is expected to store the resource-records updates.

6. The method of claim 5, wherein if the granted lease expires, the method further comprises:
   deleting the resource records, thereby ensuring that the name server does not continue to store stale resource records.

7. The method of claim 5, wherein the update-request message includes a request to extend an existing lease for a resource-record.

8. A non-transitory computer-readable storage medium storing instructions that when executed by a computer cause the computer to perform a method for updating resource records, the method comprising:
   at a network node, generating an update-request message that includes:
      a set of resource-record updates, and
      a requested lease, which specifies a time-to-live for which a name server is being requested by the network node to store the set of resource-record updates;
   sending the update-request message from the network node to the name server, which is part of a distributed system that provides a global naming service; and
   receiving a response message at the network node from the name server, wherein the response message is associated with the update-request message, and wherein the response message includes a granted lease which specifies a length of time-to-live for which the name server is expected to store the resource-records updates.

9. The computer-readable storage medium of claim 8, wherein the update-request message is an update-refresh message, which constitutes a request to extend the granted lease for the set of resource-records updates.

10. The computer-readable storage medium of claim 9, wherein the update-refresh message is identical to a preceding update-request message, which caused the name server to send a response message that included the granted lease for the set of resource-records updates.

11. The computer-readable storage medium of claim 8, wherein if the response message is not received within a specified time, the method further comprises resending the update-request message to the name server.

12. A non-transitory computer-readable storage medium storing instructions that when executed by a computer cause the computer to perform a method for updating resource records, the method comprising:
   receiving an update-request message at a name server, wherein the update-request message is received from a network node, and wherein the update-request message includes:
      a set of resource-record updates, and
      a requested lease, which specifies a time-to-live for which the name server is being requested by the network node to store the set of resource-record updates;
   updating resource records using the information contained in the update-request message; and
   sending a response message to the network node, wherein the response message includes a granted lease which specifies a time-to-live for which the name server is expected to store the resource-records updates.

13. The computer-readable storage medium of claim 12, wherein if the granted lease expires, the method further comprises:
   deleting the resource records, thereby ensuring that the name server does not continue to store stale resource records.

14. The computer-readable storage medium of claim 12, wherein the update-request message includes a request to extend an existing lease for a resource-record.

15. An apparatus for updating resource records, the apparatus comprising:
   a network node, wherein the network node comprises:
      a generating mechanism in the network node configured to generate an update-request message that includes:
         a set of resource-record updates, and
         a requested lease, which specifies a time-to-live for which a name server is being requested by the network node to store the set of resource-record updates;
      a sending mechanism in the network node configured to send the update-request message to the name server, which is part of a distributed system that provides a global naming service; and
      a receiving mechanism in the network node configured to receive a response message from the name server, wherein the response message is associated with the update-request message, and wherein the response message includes a granted lease which specifies a time-to-live for which the name server is expected to store the resource-records updates.

16. The apparatus of claim 15, wherein the update-request message is an update-refresh message, which constitutes a request to extend the granted lease for the set of resource-records updates.

17. The apparatus of claim 16, wherein the update-refresh message is identical to a preceding update-request message, which caused the name server to send a response message that included the granted lease for the set of resource-records updates.

18. The apparatus of claim 15, wherein if the response message is not received within a specified time, the method further comprises resending the update-request message to the name server.

19. An apparatus for updating resource records, the apparatus comprising:
- a network node;
- a receiving mechanism configured to receive an update-request message at a name server, wherein the update-request message is received from the network node, and wherein the update-request message includes:
  - a set of resource-record updates, and
  - a requested lease, which specifies a time-to-live for which the name server is being requested by the network node to store the set of resource-record updates;
- an updating mechanism configured to update resource records using the information contained in the update-request message; and
- a sending mechanism configured to send a response message to the network node, wherein the response message includes a granted lease which specifies a time-to-live for which the name server is expected to store the resource-records updates.

* * * * *